(12) United States Patent
Ohmura et al.

(10) Patent No.: US 8,132,195 B2
(45) Date of Patent: Mar. 6, 2012

(54) DISK DEVICE WITH SHAPE IDENTIFIER

(75) Inventors: Hiroshi Ohmura, Ishikawa (JP); Hiroto Nishida, Ishikawa (JP); Motoki Kuroda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 879 days.

(21) Appl. No.: 11/574,908

(22) PCT Filed: Sep. 12, 2005

(86) PCT No.: PCT/JP2005/016728
§ 371 (c)(1),
(2), (4) Date: Mar. 8, 2007

(87) PCT Pub. No.: WO2006/030729
PCT Pub. Date: Mar. 23, 2006

(65) Prior Publication Data
US 2008/0320506 A1    Dec. 25, 2008

(30) Foreign Application Priority Data
Sep. 13, 2004   (JP) .................................. 2004-265555

(51) Int. Cl.
*G11B 17/04*    (2006.01)
(52) U.S. Cl. ........................ 720/626; 720/624; 720/645
(58) Field of Classification Search ............... 369/47.14, 369/47.38–47.39, 53.12–53.17, 53.2–53.23; 720/617, 619–626, 627–628, 645, 630–631; 382/286–297
See application file for complete search history.

(56) References Cited

U.S. PATENT DOCUMENTS
4,497,049 A * 1/1985 d'Alayer de Costemore d'Arc ......................... 369/47.11
(Continued)

FOREIGN PATENT DOCUMENTS
EP    0 409 110 A2    1/1991
(Continued)

OTHER PUBLICATIONS
Machine-Assisted Translation of JP 2003-109368.*
(Continued)

*Primary Examiner* — Nathan Danielsen
(74) *Attorney, Agent, or Firm* — RatnerPrestia

(57) ABSTRACT

A disk device is capable of quickly identifying an inserted optical disk. A reading portion obtains disk surface information from an optical disk that is passing, and stores the obtained disk surface information in a storing portion provided in a disk playing device. An identifying portion decides whether or not the disk playing device is able to play the optical disk, based on the surface information.

5 Claims, 7 Drawing Sheets

U.S. PATENT DOCUMENTS

| | | | |
|---|---|---|---|
| 5,587,982 A * | 12/1996 | Choi | 369/53.11 |
| 5,987,191 A * | 11/1999 | Suzuki | 382/294 |
| 2001/0038588 A1* | 11/2001 | Nagatomo et al. | 369/53.22 |
| 2003/0099167 A1* | 5/2003 | Lee | 369/53.22 |
| 2004/0212670 A1* | 10/2004 | McClellan et al. | 347/224 |
| 2005/0219965 A1* | 10/2005 | Kinoshita et al. | 369/30.27 |
| 2006/0080687 A1* | 4/2006 | Miyashita | 720/603 |
| 2006/0146677 A1* | 7/2006 | Fukui et al. | 369/53.25 |

FOREIGN PATENT DOCUMENTS

| | | |
|---|---|---|
| EP | 1 434 200 A2 | 6/2004 |
| JP | 56-048006 U | 4/1981 |
| JP | 59-099208 A | 6/1984 |
| JP | 59-180867 A | 10/1984 |
| JP | 61-162704 A | 7/1986 |
| JP | 64-057458 A | 3/1989 |
| JP | 02-089663 U | 7/1990 |
| JP | 03-049692 | 5/1991 |
| JP | 04-032068 A | 2/1992 |
| JP | 05-008753 | 2/1993 |
| JP | 05-015194 | 2/1993 |
| JP | 09-147539 A | 6/1997 |
| JP | 09-190671 A | 7/1997 |
| JP | 10-275405 A | 10/1998 |
| JP | 2000-348391 A | 12/2000 |
| JP | 2002245622 A * | 8/2002 |
| JP | 2003-109368 A | 4/2003 |
| JP | 2003-248995 A | 9/2003 |
| JP | 2003338112 A * | 11/2003 |
| JP | 2004-022050 | 1/2004 |
| JP | 2006-535870 | 8/2010 |
| JP | 2006-535870 | 2/2011 |

OTHER PUBLICATIONS

Machine-Assisted Translation of JP 2003338112 A.*
International Search Report for Application PCT/JP2005/016728 dated Aug. 3, 2007.
International Search Report for Application PCT/JP2005/016728, dated Dec. 13, 2005.
DVD video recorder instruction manual, Model No. DMR-E100H [online], Matsushita Electric Industrial Co., Ltd, 2003, p. 10-11, (Jan. 28, 2010, URL:http://ctlg.Panasonic.jp/product/info.do?pg=04&hb-DMR-E 100H).

* cited by examiner

DISK DEVICE WITH SHAPE IDENTIFIER

This application is a U.S. National Phase Application of PCT International Application PCT/JP2005/16728.

TECHNICAL FIELD

The present invention relates to a disk device for identifying an optical disk inserted into a disk playing device, or the like.

BACKGROUND ART

In the prior art, the disk playing device that is able to play the music and the video carries automatically the inserted optical disk to a predetermined position in the disk playing device and rotates the disk, starts the reading of information data by the optical pickup, and plays the music and the video, or the like recorded on the optical disk. The user can identify the contents of the inserted optical disk by the played music or video, or the like (see Patent Literature 1, for example).
Patent Literature 1: JP-A-2004-22050

DISCLOSURE OF THE INVENTION

Problems that the Invention is to Solve

However, according to the disk playing device in the prior art, the user cannot obtain information of the optical disk until a series of operations such as the optical disk carrying operation and the playing operation of the disk playing device. Therefore, there are unfavorable circumstances such that, because it takes much time to get information, the user cannot check immediately whether or not the inserted optical disk corresponds to the optical disk to be played.

The present invention has been made in view of the above circumstances, and it is an object of the present invention to provide a disk device capable of identifying quickly an inserted optical disk.

Means for Solving the Problems

A disk device of the present invention, includes a disk carrying unit for carrying an inserted optical disk to a predetermined position; and a disk reading unit for reading surface information on at least any one of a data surface and a non-data surface of the optical disk; wherein the disk reading unit reads the surface information in a state that the optical disk is being carried by the disk carrying unit.

According to this configuration, the optical disk can be read while such optical disk is being carried. Therefore, the optical disk can be identified quickly.

Also, the disk device of the present invention further includes a play deciding unit decides whether or not the optical disk is playable, based on information read by the disk reading unit.

According to this configuration, it can be decided quickly whether or not the inserted optical disk is playable.

Also, in the disk device of the present invention, when a decision result by the play deciding unit indicates that the optical disk is unplayable, the disk carrying unit carries the optical disk in a direction to eject the optical disk.

According to this configuration, the carrying of the unplayable optical disk is stopped and this optical disk is ejected. Therefore, a trouble caused by the insertion of the unplayable optical disk can be prevented.

Also, the disk device of the present invention further includes an informing unit for informing that the optical disk is unplayable when the decision result by the play deciding unit indicates that the optical disk is unplayable.

According to this configuration, when the inserted optical disk is unusable, the user can be informed quickly that the inserted optical disk is unplayable.

Also, in the disk device of the present invention, the play deciding unit has a shape identifying unit for identifying a shape of the optical disk from the information read by the disk reading unit, and decides whether or not the optical disk is playable, based on the identified shape.

According to this configuration, the optical disk having an unplayable shape can be decided quickly. Therefore, a trouble caused by the insertion of such optical disk can be prevented.

Also, the disk device of the present invention further includes a data surface identifying unit for identifying whether a surface of the optical disk read by the disk reading unit corresponds to a data surface on which data are recorded or a non-data surface on which data are not recorded, based on the read information.

According to this configuration, the direction of the inserted optical disk can be identified.

Also, in the disk device of the present invention, the play deciding unit decides that the optical disk is unplayable when the data surface identified by the data surface identifying unit is not directed in a predetermined direction, and the disk carrying unit carries the optical disk in a direction to eject the optical disk when it is decided by the play deciding unit that the optical disk is unplayable.

According to this configuration, it can be decided quickly that the direction of the inserted optical disk is not set in the playable direction.

Also, in the disk device of the present invention, the disk reading unit is an imaging unit for picking up the non-data surface identified by the data surface identifying unit, and such disk device further includes a displaying unit for displaying the picked-up image of the non-data surface.

According to this configuration, the image of the non-data surface of the inserted optical disk is displayed. Therefore, the user can recognize quickly which optical disk has been inserted.

Also, the disk device of the present invention further includes a plurality of disk housing portions for housing the optical disks therein respectively; and a disk managing unit for managing identification information about respective disk housing portions and information read by the disk reading unit to correlate with each other.

According to this configuration, in the disk changer device that can house a plurality of disks therein, or the like, for example, the user can manage quickly which disk is inserted into which housing portion.

Also, the disk device of the present invention further includes a plurality of disk housing portions for housing the optical disks therein respectively; and a disk managing unit for managing identification information about respective disk housing portions and information read by the disk reading unit to correlate with each other; wherein the displaying unit displays the picked-up image to correlate with the identification information of the disk housing portions.

According to this configuration, in the disk changer device that can house a plurality of disks therein, or the like, for example, there is no need for the user to remember in which housing portions a plurality of disks have been housed, and the user can recognize easily such situation.

Also, in the disk device of the present invention, a direction of a reference mark recited on a non-data surface of the disk is identified from the information read by the disk reading unit, and the picked-up image is displayed to conform to the direction of the reference mark.

According to this configuration, the displayed image is set to respond to the direction of the reference mark. Therefore, a degree of the user's recognition can be further increased.

Advantages of the Invention

According to the present invention, the disk device capable of identifying quickly the inserted optical disk can be provided.

Figure 1:
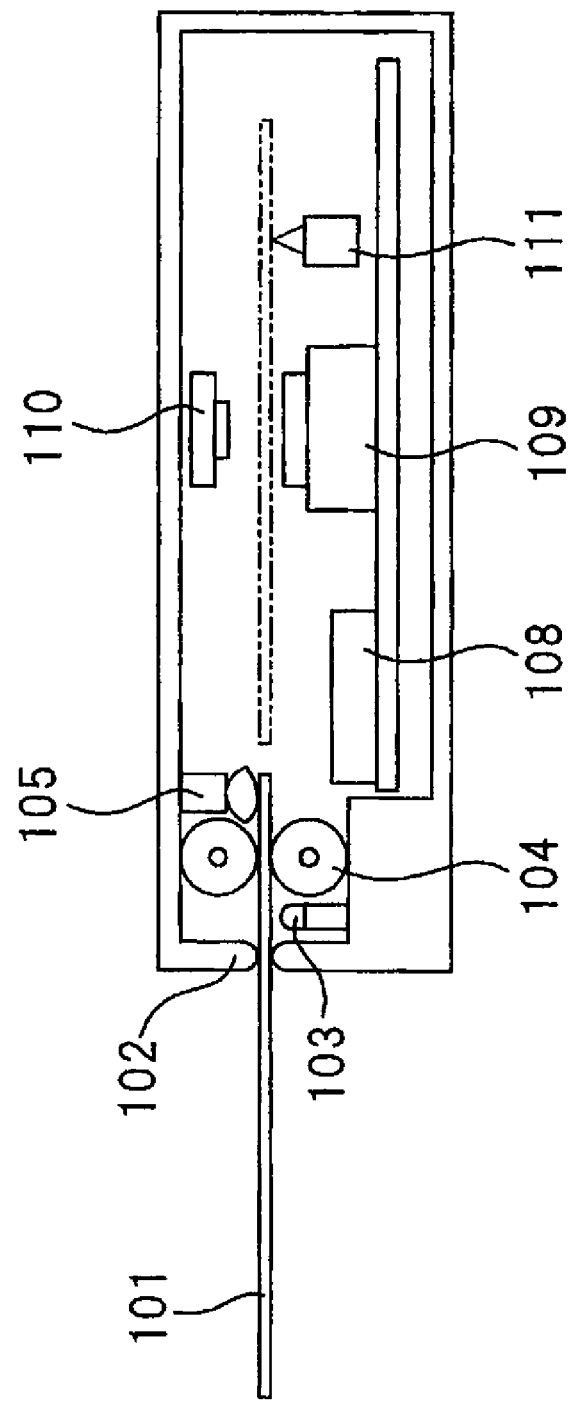
FIG. 1 A view showing an internal configuration of a disk playing device using a disk device according to a first embodiment of the present invention.

DESCRIPTION OF REFERENCE NUMERALS 100, 800 disk playing device
101 optical disk
102 insertion slot
103 insertion detecting sensor
104 carrying portion
105 reading portion
106, 806 storing portion
107 identifying portion
108, 808 controlling portion
109 playing portion
110 holding portion
111 optical pickup
112 external displaying portion
113 operation portion
805 surface image picking portion
807 label surface displaying portion
813 operation button
900 disk changer unit

BEST MODE FOR CARRYING OUT THE INVENTION

Embodiments of the present invention will be explained with reference to the drawings hereinafter. Here, the case where a disk device is applied to a disk playing device is explained in the present embodiment.

First Embodiment

Figure 2:
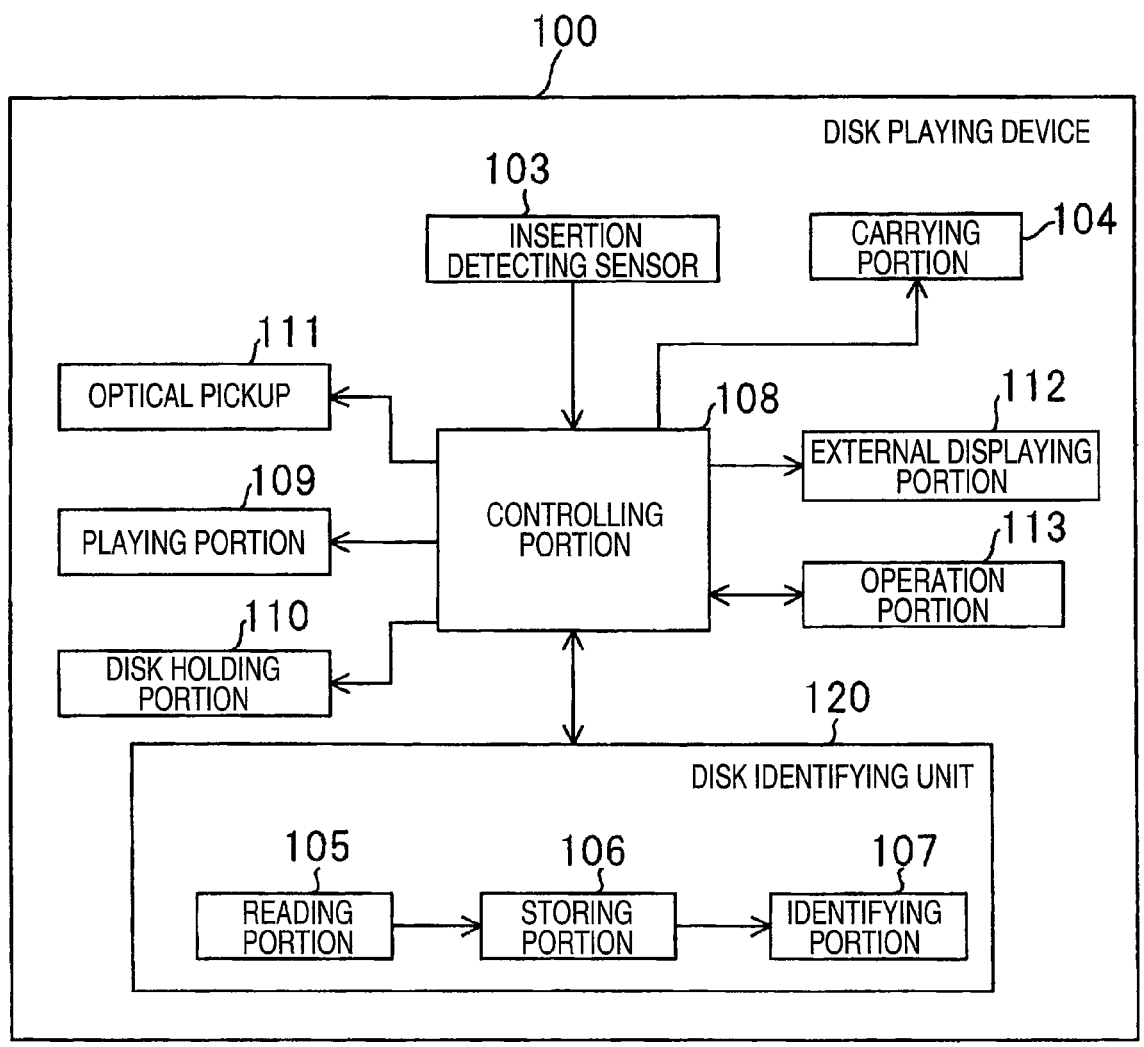
FIG. 2 A block diagram showing a principal configuration of the disk playing device using the disk device according to the first embodiment of the present invention.

FIG. 1 is a view showing an internal configuration of a disk playing device using a disk device according to a first embodiment of the present invention. FIG. 2 is a block diagram showing a principal configuration of the disk playing device using the disk device according to the first embodiment of the present invention.

In FIG. 1 and FIG. 2, a disk playing device 100 is constructed by an insertion slot 102 through which an optical disk 101 is inserted, an insertion detecting sensor 103, a carrying portion 104 as an example of the disk carrying unit, a disk identifying unit 120 as an example of the play deciding unit, a controlling portion 108, a playing portion 109, a disk holding portion 110, an optical pickup 111, an external displaying portion 112, and an operation portion 113.

The optical disk 101 is the optical disk such as CD, DVD, or the like, and has a data surface 101a on which data are recorded and a non-data surface (so-called label surface) 101b on which data are not recorded. The information is recorded on the spiral track from the inner peripheral side to the outer peripheral side (or from the outer peripheral side to the inner peripheral side).

The insertion detecting sensor 103 senses that the optical disk 101 is inserted through the insertion slot 102, and outputs a sense signal to the controlling portion 108 described later.

The carrying portion 104 has a carrying roller for carrying the optical disk 101 to an inside of the disk playing device 100. The carrying portion 104 carries the optical disk 101 to a predetermined position of the inside of the disk playing device 100 in accordance with a control signal from the controlling portion 108 when the optical disk 101 is to be played, and reverses a rotation of the carrying roller in accordance with a control signal from the controlling portion 108 to eject the optical disk 101 when the instruction to remove the optical disk 101 is given or when it is decided that the optical disk 101 being carried is unplayable.

The disk identifying unit 120 decides whether or not the optical disk 101 can be played by the disk playing device 100. The disk identifying unit 120 is constructed by a reading portion 105, a storing portion 106, and an identifying portion 107.

The reading portion 105 as an example of the reading unit catches disk surface information from the optical disk 101 that is passing through the reading portion 105. For example, the reading portion 105 contains a linear image sensor, an optical system, an illumination light source, etc. as constituent elements. As the linear image sensor, for example, the sensor for converting light signals caught by a large number (N) of light receiving elements being aligned laterally in a row, for example, into N sequential voltage signals and outputting the converted signals is employed. In order to cope with the colored information, the color CCD liner image sensor into which three-line CCDs (Charge-Coupled Devices) and color filters are incorporated as one package may be employed. This disk surface information gives an outer shape of the optical disk, and the like. The storing portion 106 stores the disk surface information caught by the reading portion 105 therein.

The identifying portion 107 decides whether or not the optical disk 101 can be played by the disk playing device 100, based on the disk surface information stored in the storing portion 106. When the identifying portion 107 decides that the optical disk 101 cannot be played by the disk playing device 100, it sends out the signal to the effect that this optical disk cannot be played, to the controlling portion 108. Here, when the identifying portion 107 decides whether or not the optical disk 101 can be played by the disk playing device 100, this identifying portion 107 compares the disk surface information caught by the reading portion 105 with basic information of the playable optical disk stored previously therein to decide whether or not the optical disk 101 can be played.

The controlling portion 108 controls an overall operation of the disk playing device 100. The controlling portion 108, when receives a disk sensing signal from the insertion detecting sensor 103, sends out the instruction to carry the optical disk 101 inserted into the carrying portion 104. Also, the controlling portion 108, when receives the signal to the effect that this optical disk cannot be played, sends out a rotation stop signal to the carrying portion 104.

The playing portion 109 plays the optical disk 101. The disk holding portion 110 holds the optical disk 101.

The optical pickup 111 reads optically the information recorded on the rotating optical disk 101 and converts the information into electric signals, while moving from the inner periphery to the outer periphery (or from the outer periphery to the inner periphery) of the optical disk 101 in the radial direction.

The external displaying portion 112 displays a disk title reproduced from the disk data and a disk surface image read from the label surface of the optical disk 101, and also displays the warning to the effect that this optical disk cannot be played when it is decided that the optical disk 101 cannot be played by the disk playing device 100. The operation portion 113 is used to input the instruction such as stop, fast forward, rewind, or the like.

Next, an operation, mainly an optical disk identifying operation, of the disk playing device using the disk identifying unit constructed as above will be explained with reference to FIG. 3 hereunder.

First, the optical disk 101 is inserted into the insertion slot 102 (step S301). Then, the insertion detecting sensor 103 senses that the optical disk 101 is inserted and outputs an insertion sensing signal to the controlling portion 108 (step S302).

When the controlling portion 108 receives the insertion sensing signal from the insertion detecting sensor 103, it sends out the instruction to the carrying portion 104 to carry the inserted optical disk 101. Then, the carrying portion 104 carries the optical disk 101 in accordance with this carrying instruction (step S303).

The controlling portion 108 causes the reading portion 105 to operate at the same time when the optical disk 101 is carried, and the reading portion 105 reads the disk surface information on the optical disk 101 being passed (step S304). Then, the reading portion 105 stores the obtained disk surface information in the storing portion 106 provided in the disk playing device 100, and transmits the disk surface information to the identifying portion 107.

The identifying portion 107 decides whether or not the disk playing device 100 can play the optical disk 101, based on the received disk surface information (step S305). Here, when the identifying portion 107 decides whether or not the optical disk 101 can be played by the disk playing device 100, such identifying portion 107 decides whether or not the optical disk 101 can be played, by using basic information of the playable optical disk, which are stored in advance therein.

Figure 4:
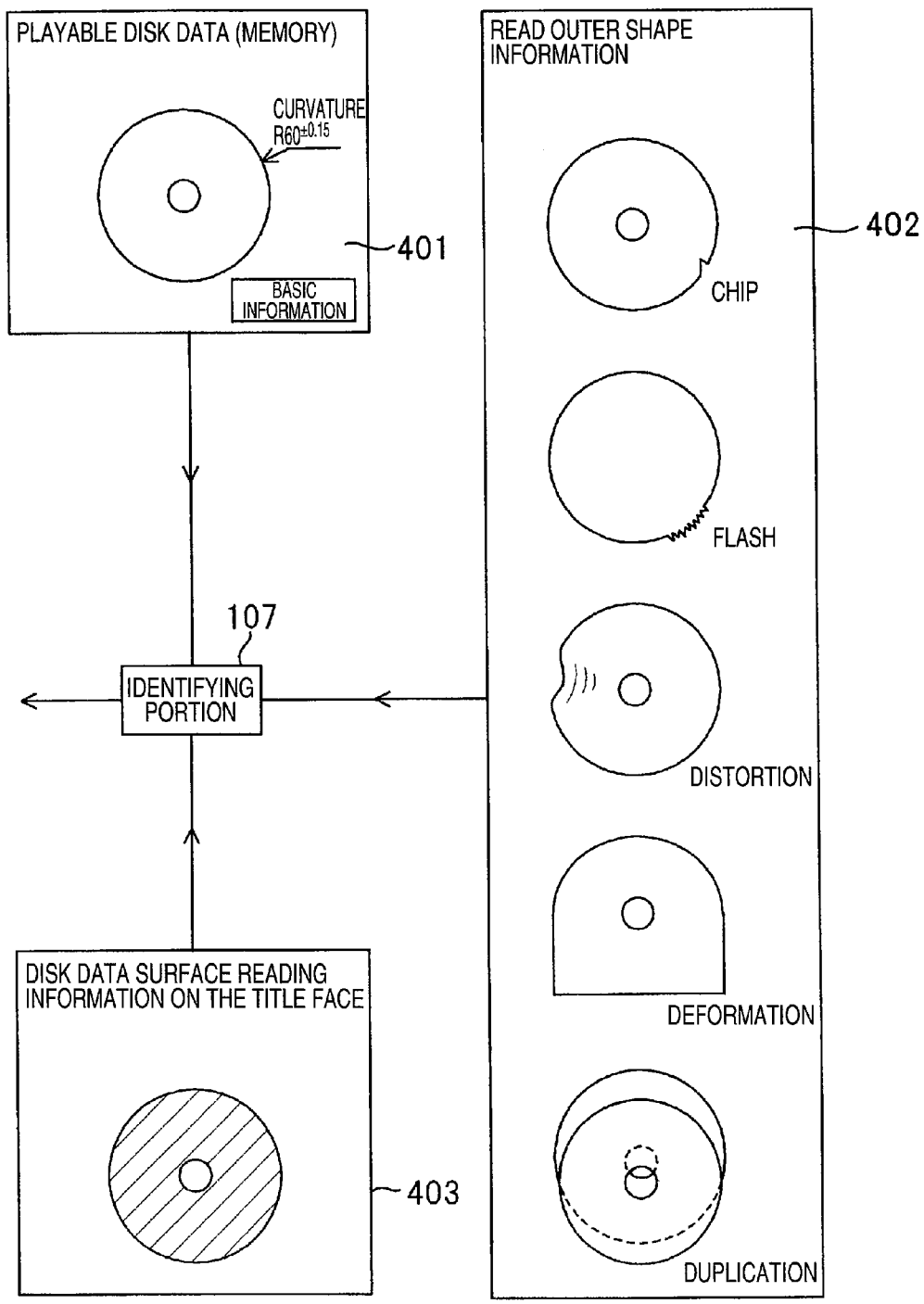
FIG. 4 A view showing information used when an identifying portion decides whether or not the optical disk is playable.

FIG. 4 shows the information used when the identifying portion 107 decides whether or not the optical disk 101 is playable. In FIG. 4, basic information 401 are basic information about the shape of the playable disk stored previously in the identifying portion 107, and read outer shape information 402 are examples of the surface information of the optical disk 101 read by the reading portion 105. Also, surface image information 403 are data surface reading information. The identifying portion 107 compares the read outer shape information 402 with the basic information 401 to identify whether or not the optical disk 101 is playable.

As the outer shape of the optical disk, an outer curvature is set to 60±0.15 mm as the standard in the 120 mm compact disk (abbreviated as "CD" hereinafter). An outer shape of the inserted optical disk 101 is read using the basic information 401, and a curvature is derived from the outer peripheral image. When the sensed curvature is out of the curvature range within which the disk playing device 100 can play the optical disk, it is decided that the inserted optical disk 101 has the unplayable shape.

Figure 5:
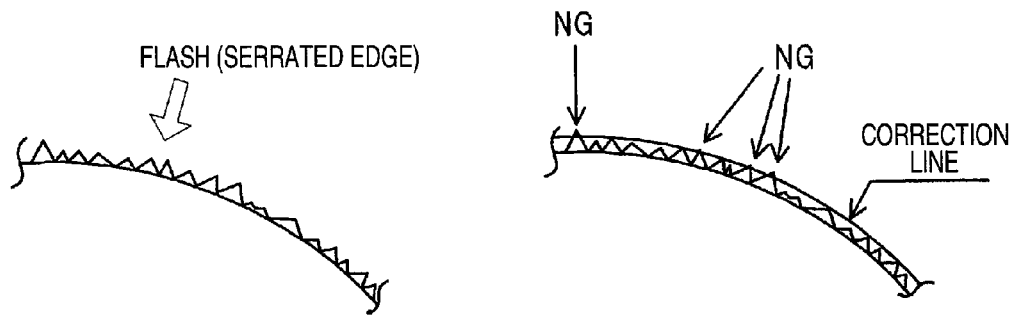
FIG. 5 Views showing a part of an outer periphery of the optical disk having a particular defective shape respectively.

FIG. 5 shows a part of outer peripheries of the optical disks each having a particular defective shape. Since the optical disk 101 is molded from a resin, it is feared that a flash is generated in the molding. As shown in FIG. 5(A), there is a danger that the flash as unevenness generated on the outer peripheral portion of the optical disk 101 interferes with the carrying or the fixing/holding of the optical disk 101. However, since sometimes the user cannot discriminate the flash, such user inserts the optical disk 101 into the insertion slot 102 as it is, and it is possible to act as the cause of the trouble.

Therefore, when a resolution of the read outer peripheral image of the disk is set low, the flash, so-called uneven shape of the outer peripheral portion, is flattened upon identification a size or a shape of the flash, so that the image of the flash can be approximated by a circular arc. When a curvature of the approximated circular arc is out of the basic information 401 in comparison or when the unevenness is still left on the approximated circular arc, it is decided that the optical disk 101 has the unplayable shape.

Also, as shown in FIG. 5(B), when the unevenness in excess of a predetermined height is sensed from the read outer peripheral image of the optical disk, it may be decided that the optical disk 101 has the unplayable shape.

Also, like the flash, as the distortion of the CD, there are a distortion left in the molding operation, a distortion caused by the using environment, and the like. Similarly the image processing is applied to the distortion, like the flash. When the read circular arc is out of the basic information 401 in comparison, it is decided that the optical disk 101 has the unplayable shape. A chip as the failure of the outer shape of the CD can be decided similarly to the flash.

A deformation of the optical disk can be decided since a curvature of the outer shape is largely deviated from the basic information. A duplication of the optical disk can be decided in such a way that, when an actual center position of the optical disk is largely deviated from a center position monitored based on the read circular arc, i.e., when the number of center positions of the circular arc is increased because the circular arc of the second optical disk is read, it is decided that plural optical disks are duplicated. Thus, it is decided that the inserted optical disk 101 has the unplayable shape.

When the optical disk is inserted by mistake to direct the label surface toward the player side, it is decided that the data surface is inserted upside down since the label surface side is sensed as the data surface. Thus, it is decided that the inserted optical disk 101 has the unplayable shape.

In step S305, if it is decided in the middle of carrying of the optical disk 101 that the optical disk 101 is unplayable, the identifying portion 107 sends out the unplayable signal to the controlling portion 108. Then, the controlling portion 108 receives the unplayable signal from the identifying portion

107 and sends out a rotation stop and rotation reverse signal to the carrying portion 104 (step S306). Then, the carrying portion 104 receives the rotation stop and rotation reverse signal from the controlling portion 108, and invert the carrying operation of the optical disk 101 (step S307).

Figure 6:
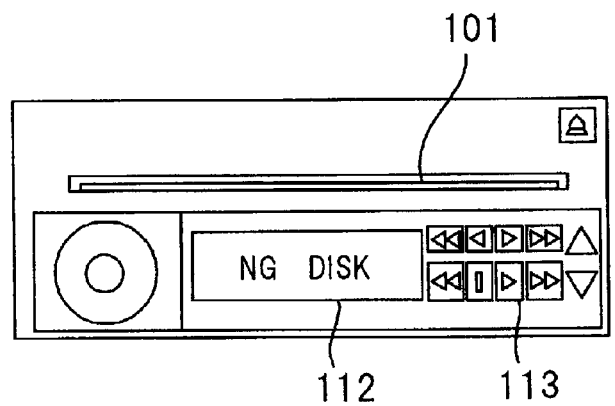
FIG. 6 A view showing a display example on an outer display portion when the optical disk is unplayable.

The optical disk 101 is ejected from the insertion slot 102 in response to the reversal of rotation (step S308). The disk playing device 100 displays the warning to the effect that the optical disk is unplayable, on the outer display portion 112 to warns the user (step S309). FIG. 6 shows a display example on the outer display portion 112 when the optical disk 101 is unplayable. Here, the warning to the user may be given by various informing unit for informing the user that the optical disk is unplayable, such as outputting an alarm from a sound outputting portion (not shown), and the like in addition to the display by the display portion 112.

In contrast, in step S305, if the identifying portion 107 decides that the optical disk 101 can be carried, such identifying portion 107 issues the instruction to the controlling portion 108 to set the optical disk 101 in the playing portion 109 in the disk playing device 100. Then, the controlling portion 108 sends out the instruction to the disk holding portion 110 to hold the disk, and the disk holding portion 110 receives the holding instruction from the controlling portion 108 and holds the optical disk 101 (step S310).

As soon as the optical disk 101 is held, the playing portion 109 starts the playing of the optical disk 101 by turning optical disk 101 and operating the optical pickup 111 to reproduce the data (step S311).

The reading portion 105 reads the disk title reproduced from the optical disk data and surface image of the label surface of the disk (step S312). The reading portion 105 stores the read disk title and surface image information of the label surface of the disk (step S313). The reading portion 105 displays the stored disk title and the disk surface image read from the label surface of the disk on the external displaying portion 112 (step S314).

The stop, the fast forward, the rewind, etc. of the optical disk 101 can be executed by operating the operation portion 113. In the present embodiment, an example where a curvature of the outer periphery is measured as the method of deciding the outer shape of the optical disk is explained. But the present invention is not limited to this example, and a method of overlapping the read information with the basic information such as a circular arc template information, or the like may be considered.

Figure 7:
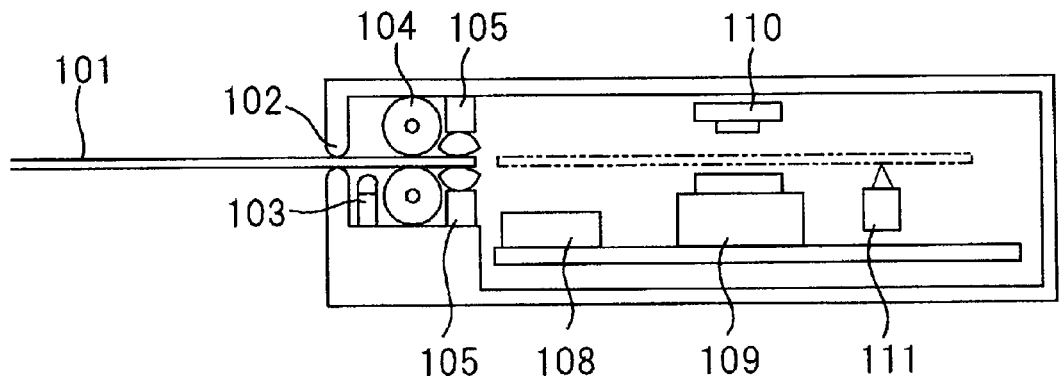
FIG. 7 A view showing an internal configuration of a disk playing device in which a reading portion is provided on both front and back sides of the optical disk.

Also, in the present embodiment, an example in which the optical disk reading portion is provided on one surface is explained. But the present invention is not limited to this example, and the optical disk reading portion may be provided on both the front and back sides. FIG. 7 is a view showing an internal configuration of a disk playing device in which a reading portion is provided on both front and back sides of the optical disk. According to this configuration, a reading accuracy can be further increased by using the disk device that can read the front and back surfaces simultaneously. Also, when scratch on the data surface is read as image data, it is decided that the inserted optical disk is the unplayable disk.

According to such disk playing device using the disk device of the first embodiment of the present invention, such advantages can be achieved that, because the identifying unit is provided, the unplayable optical disk can be decided prior to the playing of the optical disk and, because the carrying of the unplayable optical disk is stopped and the unplayable optical disk is ejected, a trouble of the disk playing device can be prevented. Also, because the unplayable optical disk can be decided prior to the playing, a loss of time in playing the optical disk can be reduced.

Second Embodiment

A second embodiment of the present invention shows an example where the disk playing device is incorporated into a disk changer unit. The disk changer unit has such a configuration that plural sheets of optical disks can be housed in the unit. The inserted optical disk is housed in the housing shelf (not shown) pointed by the user, and the optical disk can be played when the user selects the number of housing shelf in which the desired optical disk is housed.

Figure 8:
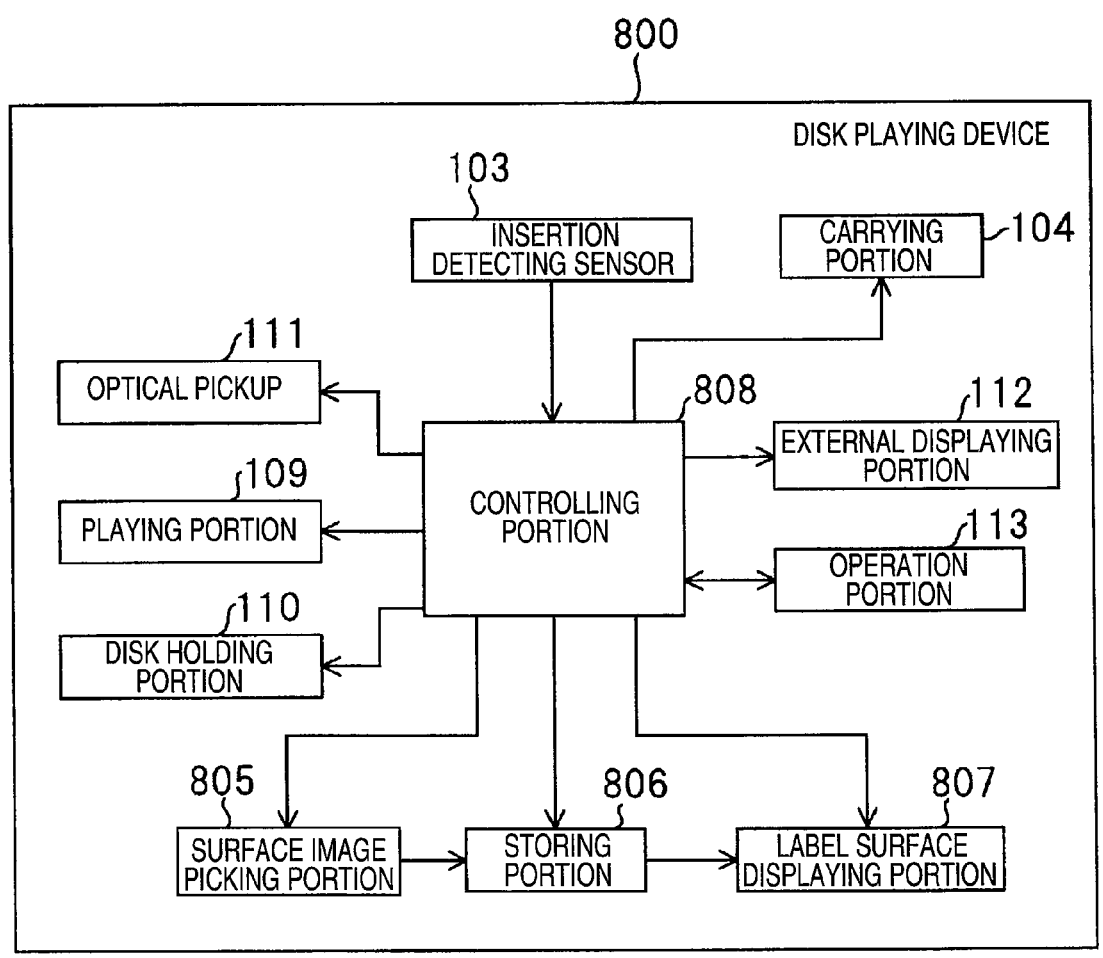
FIG. 8 A block diagram showing a principal configuration of a disk playing device according to a second embodiment of the present invention.

FIG. 8 is a block diagram showing a principal configuration of a disk playing device according to a second embodiment of the present invention. The same reference symbols are affixed to the redundant portions to those in FIG. 2 explained in the first embodiment. As shown in FIG. 8, a disk playing device 800 of the present embodiment includes a surface image picking portion 805 as an example of the imaging unit, a storing portion 806, a controlling portion 808, and a label surface displaying portion 807 as an example of the displaying unit for displaying an image of a non-data surface.

The surface image picking portion 805 picks up the label surface image of the inserted optical disk. For example, the surface image picking portion 805 contains a linear image sensor, an optical system, an illumination light source, etc. as constituent elements. As the linear image sensor, for example, the sensor for converting light signals caught by a large number (N) of light receiving elements being aligned laterally in a row, for example, into N sequential voltage signals and outputting the converted signals is employed. In order to cope with the colored information, the color CCD liner image sensor into which three-line CCDs (Charge-Coupled Devices) and color filters are incorporated as one package may be employed. The storing portion 806 manages/stores the label surface image picked up by the surface image picking portion 805 to correlate with the housing shelf that the user points out.

The surface image picking portion 805 controls an overall operation of the disk playing device 800. The label surface displaying portion 807 displays the label surface image of the inserted optical disk to correlate with the number of the housing shelf that the user points out. An operation button 813 that is cooperated with the number of the housing shelf is provided to the label surface displaying portion 807.

Next, a playing operation of the disk playing device constructed as above will be explained with reference to FIG. 9 hereunder.

Figure 3:
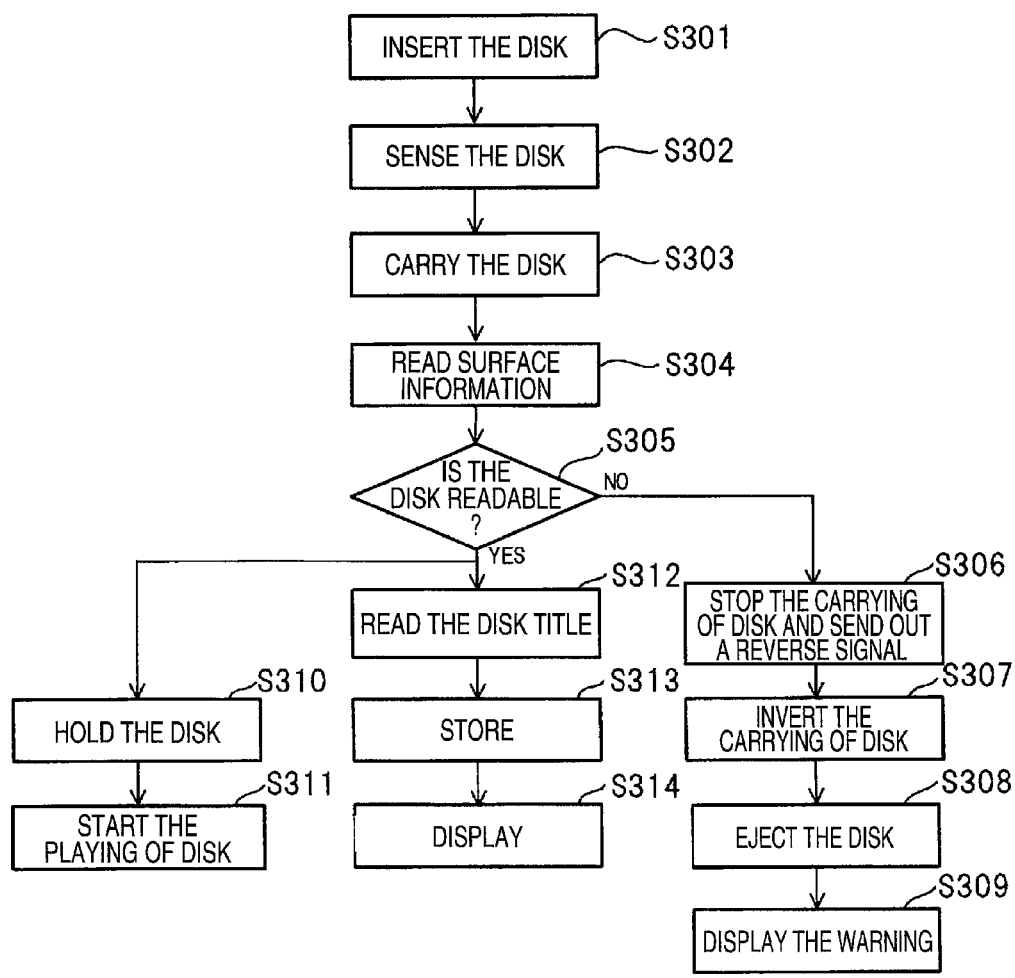
FIG. 3 A flowchart explaining an operation, mainly an optical disk identifying operation, of the disk playing device according to the first embodiment of the present invention.
Figure 9:
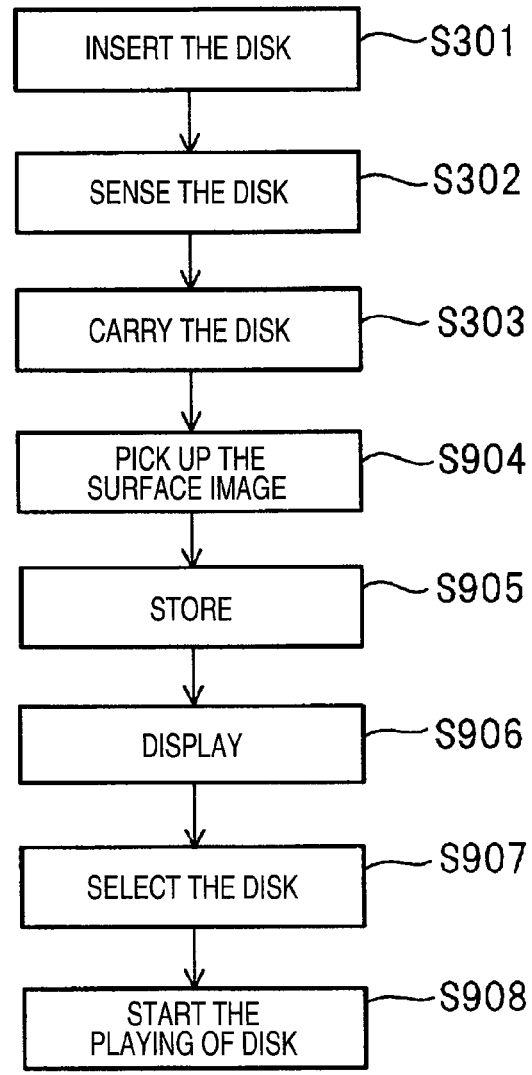
FIG. 9 A flowchart explaining a playing operation of the disk playing device according to the second embodiment of the present invention.

In FIG. 9, procedures required until the disk carried is in step S303, i.e., operations in step S301 to step S303 are similar to those of the first embodiment shown in FIG. 3, and therefore their explanation will be omitted herein.

In step S303, the surface image picking portion 805 picks up the label surface image of the optical disk 101 as soon as the carrying portion 104 carries the optical disk 101 (step S904). The storing portion 806 stores the label surface image of the optical disk 101 acquired in step S904 to correlate with the housing shelf that the user points out (step S905). The label surface displaying portion 807 displays the label surface image of the optical disk 101 stored in the storing portion 806 to correlate with the number of the housing shelf that the user points out (step S906).

Also, a reference mark identifying portion for identifying a direction of a reference mark to indicate the type of the disk set forth on the label surface and an image correcting portion for correcting a direction of the image to conform to the correct direction of this reference mark may be provided in the storing portion 806, and then the corrected image of the label surface image of the optical disk 101 may be stored in above step S905. Thus, a degree of the user's recognition by the display in above step S906 can be further increased. Here, a logotype mark such as "disc", or the like can be employed as the reference mark.

Here, the object to be identified by the reference mark identifying portion is not limited to the reference mark indicating the above type of the disk. A character, figure, or symbol, their combination, or the like may be selected as the object. For example, the data such as a predetermined character, figure, or symbol, their combination, and the like are stored in advance in the storing portion 806. Then, the reference mark identifying portion decides a matching between the image of the label surface of the optical disk 101 acquired in step S904 and the stored data as the object of identification. When it is decided as the result of matching that the image of the label surface of the optical disk 101 contains a portion that substantially coincides with the data stored previously (referred to as a "matching corresponding portion" hereinafter), the image correcting portion corrects the direction of the image to direct the matching corresponding portion in the predetermined direction.

Figure 10:
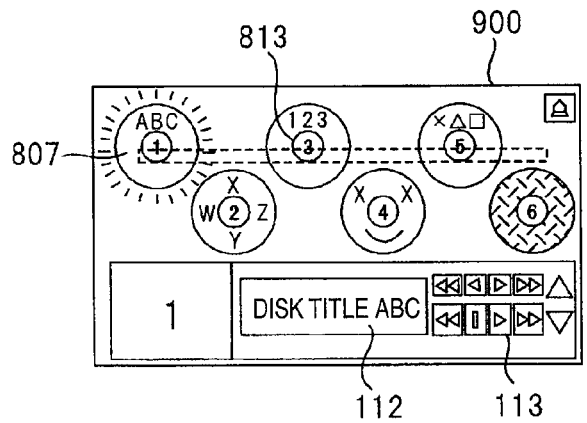
FIG. 10 A view showing a display example of a label surface displaying portion of a disk changer unit.

FIG. 10 shows a display example of the label surface displaying portion 807 of the disk changer unit 900. In an example in FIG. 10, the number of the shelves and the read label surface images of the optical disk 101 are displayed in order of housing shelves on the label surface displaying portion 807 of the disk changer unit that can house six sheets of disks.

The user selects the number of the housing shelf having the label surface of the desired optical disk by operating the selection/operation button 813 cooperated with the number of the housing shelf, while looking at the label surface image of the optical disk 101 displayed by the label surface displaying portion 807 (step S907). Then, the disk changer unit (not shown) is operated simultaneously and the desired disk housing shelf is fixed/held by the disk player (not shown), and then the playing of the disk is started (step S908).

In the present embodiment, an example where the number of the housing shelf having the label surface to be played is selected by the selection/operation button is explained. But the present invention is not limited to this example, and the label surface displaying portion may be provided as the touch panel type displaying portion. Accordingly, the selection of the housed disk can be further facilitated, According to the disk playing device of the second embodiment of the present invention, such an advantage can be achieved that, since the disk changer into which the disk device is incorporated reads/displays the title image of the label surface, the user can check the optical disk to be played with the eye. Also, such an advantage can be achieved that, since the label surface displaying portion is provided by the touch panel, an error in selecting the operation button can be prevented.

The present invention is explained in detail with reference to particular embodiments. But it is apparent for those skilled in the art that various variations and modifications can be applied without departing from a spirit and a scope of the present invention.

This application is based upon Japanese Patent Application (Patent Application No. 2004-265555) filed on Sep. 13, 2004; the entire contents of which are incorporated herein by reference.

INDUSTRIAL APPLICABILITY

The disk device of the present invention possesses such an advantage that the inserted optical disk can be identified quickly, and is useful to the disk playing device such as the car audio equipment, or the like.

The invention claimed is:

1. A disk device, comprising:
   a disk carrying unit that carries an inserted optical disk to a predetermined position;
   a disk reading unit that obtains optical information of at least any one of a data surface and a non-data surface of the optical disk;
   a shape identifying unit which senses a radial protrusion in an outer peripheral edge of the optical disk using the optical information read by the disk reading unit; and
   a play deciding unit that decides whether or not the optical disk is playable, based on whether the radial protrusion in the outer peripheral edge of the optical disk crosses a predetermined boundary in the radial direction, the play deciding unit deciding the optical disk is not playable when the radial protrusion in the outer peripheral edge of the optical disk crosses the predetermined boundary,
   wherein the disk reading unit obtains the optical information in a state that the optical disk is being carried by the disk carrying unit.

2. The disk device according to claim 1, wherein, when a decision result by the play deciding unit indicates that the optical disk is unplayable, the disk carrying unit carries the optical disk in a direction to eject the optical disk.

3. The disk device according to claim 1, further comprising:
   an informing unit that informs that the optical disk is unplayable when the decision result by the play deciding unit indicates that the optical disk is unplayable.

4. The disk device according to claim 1, further comprising:
   a data surface identifying unit that identifies whether a surface of the optical disk read by the disk reading unit corresponds to a data surface on which data are recorded or a non-data surface on which data are not recorded, based on the read information.

5. The disk device according to claim 4, wherein the play deciding unit decides that the optical disk is unplayable when the data surface identified by the data surface identifying unit is not directed in a predetermined direction, and the disk carrying unit carries the optical disk in a direction to eject the optical disk when it is decided by the play deciding unit that the optical disk is unplayable.

* * * * *